United States Patent
Johnson et al.

(10) Patent No.: US 11,482,752 B2
(45) Date of Patent: Oct. 25, 2022

(54) POLYMER DIPPED POUCH CELL

(71) Applicant: HHeLi, LLC, Tulsa, OK (US)

(72) Inventors: Paige L. Johnson, Tulsa, OK (US); James Dean Fleetwood, II, Bloomington, IN (US)

(73) Assignee: HHeLi, LLC, Tulsa, OK (US)

( * ) Notice: Subject to any disclaimer, the term of this patent is extended or adjusted under 35 U.S.C. 154(b) by 288 days.

(21) Appl. No.: 16/663,046

(22) Filed: Oct. 24, 2019

(65) Prior Publication Data

US 2020/0136106 A1 Apr. 30, 2020

Related U.S. Application Data

(60) Provisional application No. 62/749,950, filed on Oct. 24, 2018.

(51) Int. Cl.
*H01M 50/116* (2021.01)
*H01M 50/209* (2021.01)
*H01M 4/38* (2006.01)
*H01M 50/24* (2021.01)

(52) U.S. Cl.
CPC ......... *H01M 50/209* (2021.01); *H01M 4/382* (2013.01); *H01M 50/116* (2021.01); *H01M 50/24* (2021.01)

(58) Field of Classification Search
None
See application file for complete search history.

(56) References Cited

U.S. PATENT DOCUMENTS

| | | | |
|---|---|---|---|
| 9,786,910 B2 | 10/2017 | Johnson et al. | |
| 2009/0098463 A1* | 4/2009 | Liu | H01M 10/0525 |
| | | | 429/231.95 |
| 2011/0129709 A1 | 6/2011 | Ahn et al. | |
| 2017/0214079 A1 | 7/2017 | Dai et al. | |
| 2018/0294479 A1 | 10/2018 | Johnson et al. | |
| 2019/0237764 A1* | 8/2019 | Takano | H01M 4/587 |

FOREIGN PATENT DOCUMENTS

| | | |
|---|---|---|
| JP | 2003229100 A | 8/2003 |
| JP | 2007165293 A | 6/2007 |
| JP | 2018092916 A | 6/2018 |
| KR | 20060087179 A | 8/2006 |
| KR | 20160009414 A | 1/2016 |
| WO | 0023510 A1 | 4/2000 |

\* cited by examiner

*Primary Examiner* — Haixia Zhang
(74) *Attorney, Agent, or Firm* — GableGotwals

(57) ABSTRACT

A pouch cell includes a copper foil forming a pouch, an active material layer adjacent to the copper foil inside the pouch forming a cathode with the copper, and a lithium-based anode inside the pouch. The cell includes a separator interposing the one active material layer and the lithium-based anode, and an electrolyte.

8 Claims, 3 Drawing Sheets

POLYMER DIPPED POUCH CELL

CROSS-REFERENCE TO RELATED CASES

This application claims the benefit of U.S. provisional patent application Ser. No. 62/749,950, filed on Oct. 24, 2018, and incorporates such provisional application by reference into this disclosure as if fully set out at this point.

FIELD OF THE INVENTION

This disclosure relates to battery technology in general and, more particularly, to improved construction methods for battery cells.

SUMMARY OF THE INVENTION

The invention of the present disclosure, in one aspect thereof, comprises a pouch cell including a copper foil forming a pouch, an active material layer adjacent to the copper foil inside the pouch forming a cathode with the copper, and a lithium-based anode inside the pouch. The cell also includes a separator interposing the one active material layer and the lithium-based anode, and an electrolyte. In other embodiments, the active material forms an anode with the copper and the cathode is a lithium-based cathode.

In some embodiments, the active material comprises an acidified metal oxide. The active material may be applied in at least one layer inside the pouch and has a density of about 6.49 mg/cm2. The separator may comprise a pouch containing the lithium-based anode. The separator may be polypropylene.

The pouch cell may comprises a unitary segment of copper foil folded to create the pouch. The segment of copper foil may have a folded edge forming a bottom of the pouch and opposite sides of the pouch adjacent to the folded bottom edge are sealed together.

The cell may include a first terminal tab electrically connected to the lithium-based anode and accessible outside the pouch. A second terminal tab may be electrically connected to the copper foil pouch. The lithium-based anode may be a lithium foil. In some cases, the lithium-based anode consists of metallic lithium.

The pouch cell may have an insulating layer applied to an outside of the copper foil pouch. The insulating layer may comprise polyisobutylene.

The invention of the present disclosure, in another aspect thereof, comprises a method of forming a battery cell. The method includes preparing a copper foil pouch, lining an interior portion of the copper foil pouch with an active material to create a cathode pouch, providing a lithium-based foil anode surrounded by a separator inside the pouch. An electrolyte is be provided inside the pouch. The pouch is sealing upon completion.

In some embodiments, the method includes attaching a first electrical tab as a terminal to the cathode inside the pouch and routing the electrical tab to outside the pouch. The method may include affixing a second electrical tab to the copper foil pouch. Coating an outside of the copper foil pouch with an insulating material may also form part of the method.

The invention of the present disclosure, in another aspect thereof, comprises a battery cell having a copper foil pouch having an opening end and a folded end and opposite sealed-together sides. The cell includes an active material lining the copper foil pouch, a segment of lithium foil inside a separator inside the pouch, and a first terminal affixed to the lithium foil and accessibly outside the pouch. The copper foil pouch contains an electrolyte and is sealed at the opening end and encloses the lithium foil, separator, and electrolyte inside the pouch, and provides a working voltage between the copper pouch and the first terminal.

In some embodiments, the copper foil has a second terminal affixed thereto and provides the working voltage between the first and second terminals. Some embodiments include an electrically insulating polymer coating applied to an outside of the copper foil pouch.

DETAILED DESCRIPTION OF THE PREFERRED EMBODIMENTS

In various embodiments, the present disclosure describes construction of pouch-type cells based upon various battery chemistries. The present disclosure is not intended to be specific to any chemistry (unless so claimed). However, the methods and constructions used herein are known to function well with acidified metal oxides as active electrode materials such as those described in U.S. Pat. No. 9,786,910 to Johnson, et al. (herein incorporated by reference), and related materials.

Figure 1:
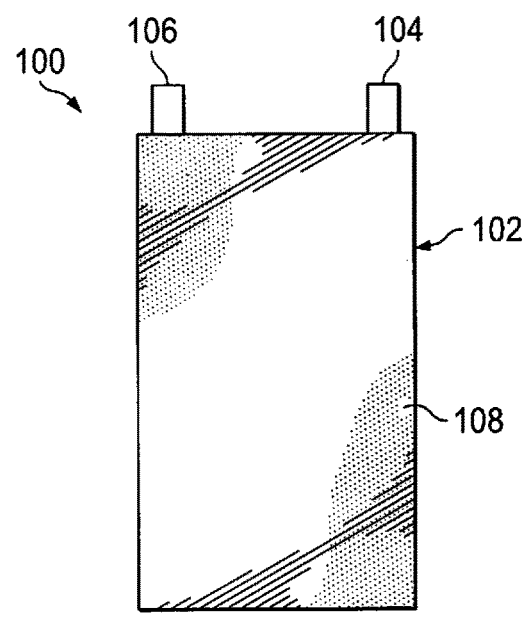
FIG. 1 is an outside view of a pouch cell according to aspects of the present disclosure.

Referring now to FIG. 1 an outside view of a pouch cell 100 according to aspects of the present disclosure is shown. The pouch cell comprises an outer pouch 102, which may comprise a metallic foil such as a copper foil. In further embodiments, the copper foil may be replaced with a polymer metalized film. Such film may also be coated with an outer insulative layer as described below. A mesh current collector (not shown) may also be used, along with sufficient outer insulative coating(s).

The outer pouch 102 may be fully or partially coated of covered with an insulating coating 108. The coating 108 may be configured to conform to the shape of the pouch 102 and may be sufficiently malleable not to flake or crack from movement of deflection of the pouch 102. In one embodiment, to form the coating 108 on the pouch 102, a butyl rubber coating is applied such as polyisobutylene (PIB). A 2% PIB/Hexane solution may be prepared, and the pouch 102 dipped into the same resulting in a PIB outer coating 108 that prevents shorting and electrically isolates components such as terminals 104, 106 from the copper foil. The PIB coating 108 thus forms a case for the pouch cell 100 that conforms to the shape of the pouch 102.

The coating 108 on the copper foil pouch 102 may be transparent or may be colored by various dyes, pigments, paints, or the like. Insulators other than PIB may also be used for the coating 108. Polymers dispersed in solvents may form the basis of an insulative coating 108 for the copper foil pouch 102. In some embodiments, the coating 108 is sprayed or painted on, and possibly actively or passively cured.

The pouch 100 is provided with an externally accessible cathode terminal 104 and an externally accessible anode terminal 106. These may also be denoted a positive terminal 104 and a negative terminal 106. The terminals 104, 106 may comprise nickel or another suitable conductor that does not react negatively with the other cell components. The terminals 104, 106 are ultrasonically welded in place in some embodiments. As illustrated, the terminals 104, 106 are metallic tabs to which clips or other fasteners may be selectively connected. However, it should be understood that the terminals 104, 106 may take whatever shape and form is necessary as is known in the art and useful for attaching the cell 100 as a subcomponent of a completed battery, or to a specific load.

Figure 2:
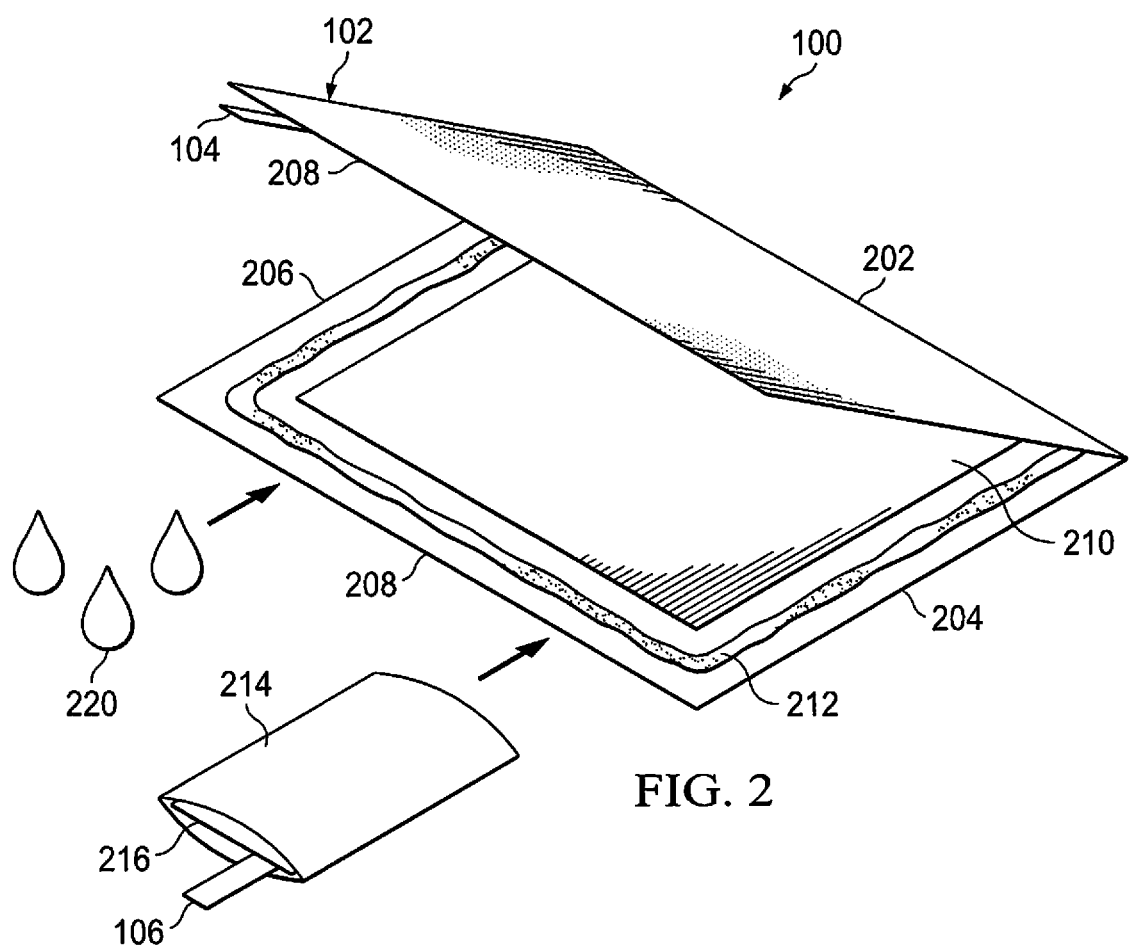
FIG. 2 is an exploded perspective view of the pouch cell of FIG. 1.

Referring now to FIG. 2 an exploded perspective view of the pouch cell 100 of FIG. 1 is shown. The exploded view of FIG. 2 illustrates various additional internal components of the cell 100. The pouch 102, as illustrated, comprises a layer of copper foil having a fold 202 near the middle thereof. The fold 202 in the copper foil creates two halves of the pouch 102 with opposite sides 204, 206. Opposite the fold 202 is a pouch mouth end 208. On the inner side of the copper foil of the pouch 102 is an active material layer 210. The active material layer 210 may be on both inner sides of the pouch 102 and, in contact with the copper foil form a cathode.

The active material 210 may be deposited as a slurry that is then cured or dried. The active material 210 may be spray applied. In some embodiments, layers of material are applied, possibly with carbon layers between. For purposes of the present disclosure, an active material is one that, when placed in contact with the copper foil of the pouch 102, a cathodic structure will result that may be used with an electrolyte, separator, and anode to function as a battery cell.

In particular embodiments, the active material 210 is a surface-functionalized, acidified metal oxide, as described in U.S. Pat. No. 9,786,910. The active material 210 may comprise, for example, at least one solid metal oxide nanomaterial including a surface that is acidic but not superacidic, the surface having a pH<5 when re-suspended, after drying, in water at 5 wt % and a Hammett function $H_0$>−12. In some embodiments, the active material 210 may be said to comprise a solid metal oxide nanomaterial being in a form $M_mO_x/G$, where $M_m$ is a metal, $O_x$ is total oxygen, $M_mO_x$ is a metal oxide, G is at least one electron-withdrawing surface group, and "/" makes a distinction between the metal oxide and the electron-withdrawing surface group, the battery electrode solid metal oxide nanomaterial having a pH<5 when re-suspended, after drying, in water at 5 wt % and a Hammett function $H_0$>−12, at least on its surface.

It should also be understood that cells may be constructed based on the present disclosure that do not utilized acidic metal oxides as active materials.

The size, volume, or area of the cathode active material 210 may vary, but overall size corresponds to overall capacity of the cell 100. Additionally, in various illustrated embodiments, the total size of the cathode is reflected in the folding or doubling over during assembly of the completed cell. The thickness of active material may vary. In one embodiment, the active material is applied at a density of 6.49 mg/cm$^2$. The ends and sides of the copper foil pouch 102 may be left free of active material to allow the foil to be folded and sealed (e.g., the folded end 202, the mouth end 208, and or the opposite sides 204, 206 may not have active material 210 applied thereon.

In order to seal or close the pouch 102 a single-piece or multi-piece adhesive strip 212 may bind the edges of the two halves of the pouch 102 together. The adhesive strip 212 may be tape, glue, or anther adhesive. The adhesive strip 212 may be chosen such that the pouch 102 will seal to contain electrolytes and other internal battery components without dissolution of the adhesive strip 212. In some embodiments, the copper foil of the pouch 102 may be cut at the fold 202 to allow easier application of the adhesive strip 212.

Contained within the pouch 102 may be a separator 214 interposing the active material 210 and an anode 216. The separator 214 may be suitable to the internal chemistry of the cell 100. In some embodiments, the separator 214 comprises Targray polypropylene or polyethylene. In some embodiments, the separator 214 may be a folded material or formed into a pouch such that is completely enclosed the anode 216 and insulates it from electrical contact with the active material 210 acting as a cathode. A segment of adhesive tape (not shown) or other device may secure the separator 214 in place around the anode 216 during pouch/cell assembly. The tape or other insulating adhesive may also serve to prevent contact between the anode tab 106 and the copper foil 102 during assembly.

The anode 216 may be a lithium-based material. If active materials 210 are used corresponding to those described in U.S. Pat. No. 9,786,910, a pure lithium foil may safely be used as the anode 216. In other embodiments, other known lithium-based compounds may be used. In some embodiments, the anode 216 comprises lithium foil having a thickness of about 1 mm.

A compatible electrolyte 220 may complete the cell 100 and may be inserted into the pouch 102 prior to final sealing of the pouch 102.

Figure 3:
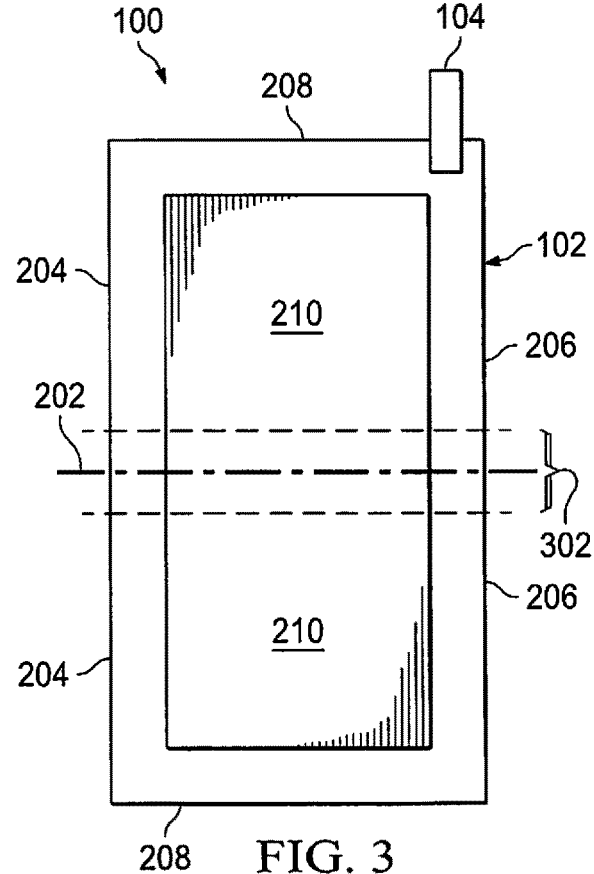
FIG. 3 is a top down view of a pouch cell under construction according to aspects of the present disclosure.

Referring now to FIG. 3, a top down view of the pouch cell 100 as it would appear under construction according to aspects of the present disclosure is shown. The pouch 102 is unfolded (or not yet folded) on fold 202 with opposite sides 204, 206 shown. Active material 210 has been applied to the inner surface of the pouch 102 with a margin allowing for sealing of the pouch 102. It may be necessary to remove active material from an area around the fold 202 as shown by 302.

Figure 4:
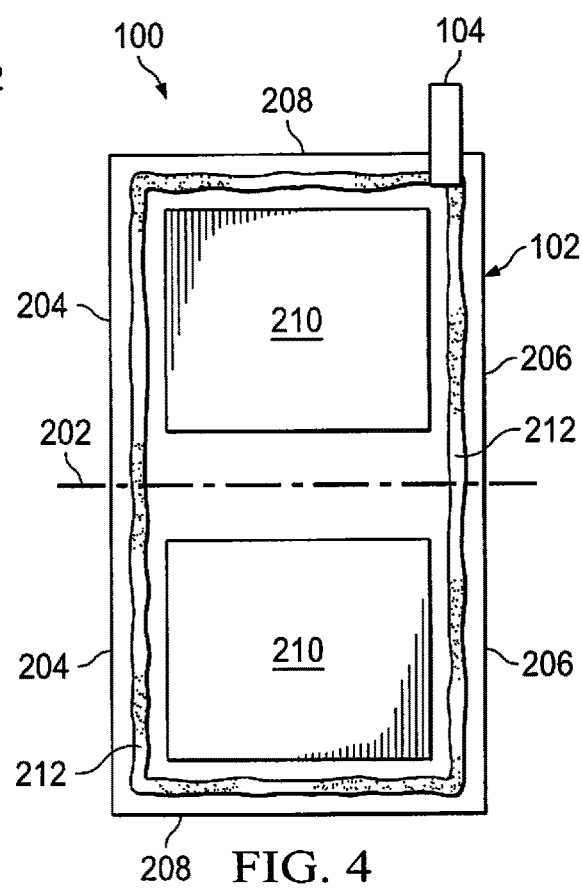
FIG. 4 is a top down view of a the pouch cell of FIG. 2 after further construction according to aspects of the present disclosure.

Referring now to FIG. 4, a top down view of a the pouch cell of FIG. 2 after further construction according to aspects of the present disclosure is shown. Here active material 110 has been removed from the area 302 around the fold 202. This may be accomplished by application and removal of masking tape that may pull active material away from the pouch 102. In other embodiments, a suitable solvent or other method may be used. A portion of the adhesive strip 212 may be applied along sides 204, 206 before the pouch 102 is folded at fold 202.

In some embodiments the mouth 208 of the pouch 102 is folded together and sealed. This may be with or without a portion of the adhesive strip 212 or another adhesive to seal the fold.

Figure 5:
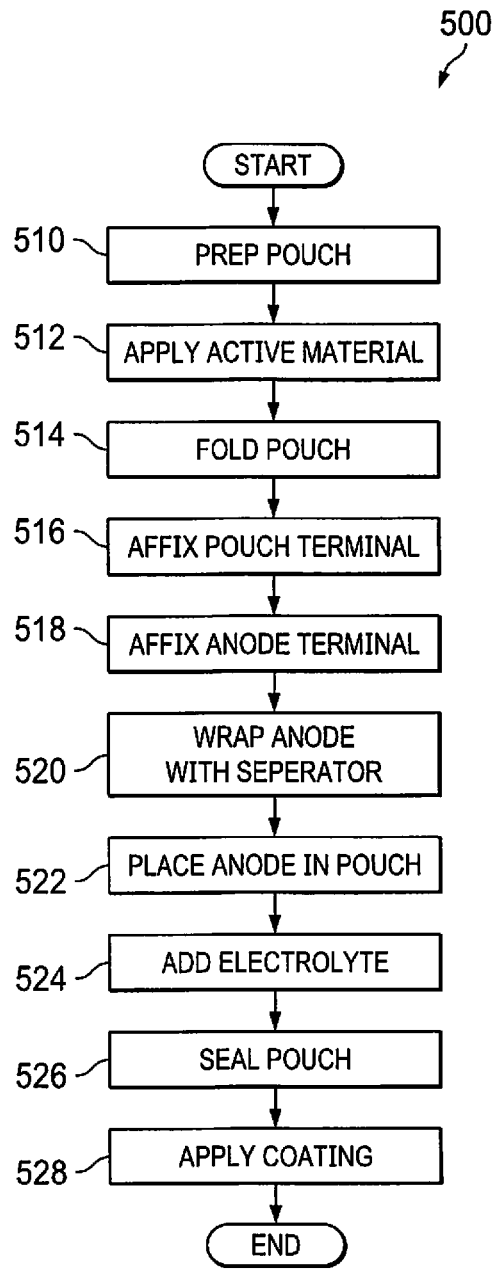
FIG. 5 is a flow chart of a pouch cell production process according to aspects of the present disclosure.

Referring now to FIG. 5, is a flow chart 500 of a pouch cell production process according to aspects of the present disclosure is shown. The method as illustrated by flow chart 500 is exemplary only. If different materials or construction methods are employed, the construction method may be adapted accordingly. At step 510 the copper foil pouch 102 is prepared. At step 512 the active material 210 is applied. This may include ensuring proper clearance at the margins to be sealed. At step 514 the foil is folded and sealed (e.g., with adhesive) as a pouch 102 with an open end 208. A tab or terminal 104 may be affixed to the foil at step 516.

At step 518 a terminal 106 is affixed to an anode 216. The anode is wrapped in a separator 214 at step 520. At step 522 the anode is placed in the pouch 102. Electrolyte may be added at step 524. The open end 208 of the pouch 102 may be sealed by folding, application of adhesive, or other methods at step 526. Finally, at step 528, the pouch 102 may have coating 108 applied thereto to insulate the pouch 102.

A pouch cell was constructed as described above. The completed pouch cell was tested to confirm that the PIB coating provided adequate electrical isolation and resistance to internal components of the pouch cell. The completed cell was also used to power loads such as LEDs.

Additional cells of varying sizes and capacities have been produced with similar positive results. A pouch cell having an active material area as small as 2 cm×2 cm per side, surrounding a 1 mm thick 1.8 cm×1.8 cm lithium foil anode has also been shown to effectively power loads such as LEDs.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A pouch cell comprising:
a copper foil forming a pouch, the copper foil being a unitary segment of copper foil having a folded edge forming a bottom of the pouch and equal-sized opposite halves of the pouch adjacent to the folded bottom edge being sealed sides;
an active material layer adjacent to the copper foil inside the pouch, the active material layer including an acidified metal oxide and forming a cathode with the copper;
a lithium-based anode inside the pouch and surrounded by the active material layer;
a separator interposing the active material layer and the lithium-based anode;
an electrolyte; and
an insulating layer outside the pouch including polyisobutylene.

2. The pouch cell of claim 1, wherein the active material is applied in at least one layer inside the pouch with a density of about 6.49 mg/cm$^2$.

3. The pouch cell of claim 2, wherein the separator comprises a pouch containing the lithium-based anode.

4. The pouch cell of claim 3, wherein the separator comprises polypropylene.

5. The pouch cell of claim 1, further comprising a first terminal tab electrically connected to the lithium-based anode and accessible outside the pouch.

6. The pouch cell of claim 5, further comprising a second terminal tab electrically connected to the copper foil pouch.

7. The pouch cell of claim 6, wherein the lithium-based cathode anode is a lithium foil.

8. The pouch cell of claim 7, wherein the lithium-based cathode anode consists of metallic lithium.

\* \* \* \* \*

UNITED STATES PATENT AND TRADEMARK OFFICE
CERTIFICATE OF CORRECTION

PATENT NO. : 11,482,752 B2
APPLICATION NO. : 16/663046
DATED : October 25, 2022
INVENTOR(S) : Paige L. Johnson and James Dean Fleetwood, II Page 1 of 1

It is certified that error appears in the above-identified patent and that said Letters Patent is hereby corrected as shown below:

In the Claims

Column 7, Line 2 "cathode anode" should be corrected to "anode"
Column 7, Line 4 "cathode anode" should be corrected to "anode"

Signed and Sealed this
Twenty-fourth Day of January, 2023

Katherine Kelly Vidal
*Director of the United States Patent and Trademark Office*